United States Patent [19]
Lin

[11] Patent Number: 6,035,746
[45] Date of Patent: Mar. 14, 2000

[54] GEAR TRANSMISSION CARTRIDGE

[76] Inventor: Ching Chou Lin, No. 150, Sec. 3, Chung San Road, Wu Zh Hsiang, Taichung Hsien, Taiwan

[21] Appl. No.: 09/201,684

[22] Filed: Nov. 30, 1998

[51] Int. Cl.[7] .................................................. B25B 17/00
[52] U.S. Cl. .............................. 81/57.31; 81/57.14; 81/60
[58] Field of Search .................................. 81/57.3, 57.31, 81/57.42, 57.18, 62, 63.1, 57.14, 60, 61

[56] References Cited

U.S. PATENT DOCUMENTS 5,406,866   4/1995   Badiali ...................................... 81/57.3

*Primary Examiner*—Timothy V. Eley
*Assistant Examiner*—Willie Berry, Jr.

[57] ABSTRACT

A cartridge includes two stems rotatably received in a housing and each having a gear extended inward of the housing. A gear transmission device is coupled between the gears of the stems for allowing one of the stems to be driven by the other stem with a greater speed and the other stem to be driven with a greater torque. The gear transmission device includes three or more gear members each having two gear portions of different sizes for engaging with the gears of the stems. A ratchet mechanism is disposed in the housing for controlling driving directions between the stems.

9 Claims, 3 Drawing Sheets

GEAR TRANSMISSION CARTRIDGE

The present invention is related to U.S. patent application Ser. No. 09/131,932, filed on Aug. 10, 1998.

BACKGROUND OF THE INVENTION

1. Field of the Invention

The present invention relates to a cartridge, and more particularly to a cartridge having a gear transmission device for transmission purposes.

2. Description of the Prior Art

A typical speed selectable screw driver is disclosed in U.S. Pat. No. 5,406,866 to Badiali and includes a driving stem rotatably secured in a handle and a gear transmission device disposed in the handle and coupled between the handle and the driving stem for allowing the handle to drive the driving stem. However, two clutch devices are required to be provided in the gear transmission device for allowing the driving stem to be rotated by the handle, such that the tool includes a complicated configuration.

The present invention has arisen to mitigate and/or obviate the afore-described disadvantages of the conventional gear transmission tools.

SUMMARY OF THE INVENTION

The primary objective of the present invention is to provide a cartridge having a gear transmission device for coupling a driving tool to a fastener and for selectively driving the fastener with a greater speed or with an increased torque.

In accordance with one aspect of the invention, there is provided a cartridge comprising a housing including a pair of orifices, a pair of stems rotatably received in the orifices respectively and each including an engaging hole formed therein for receiving fasteners, the stems each including a gear extended inward of the housing, a gear transmission device coupled between the gears of the stems for allowing a first of the stems to be driven by a second of the stem when the second stem is driven by a driving tool, and for allowing the second stem to be driven by the first stem when the first stem is driven by the driving tool, and a ratchet means for controlling driving directions between the stems.

The gear of the first stem includes a size greater than that of the second stem for allowing the second stem to be rotated in a greater speed by the first stem and for allowing the first stem to be rotated in a greater torque by the second stem.

The gear transmission device includes at least three gear members rotatably secured in the housing and each having a first gear portion engaged with the gear of the second stem and each having a second gear portion engaged with the gear of the first stem, the first gear portions of the gear members include a size greater than that of the second gear portions for allowing the second stem to be rotated in a greater speed by the first stem and for allowing the first stem to be rotated in a greater torque by the second stem.

The housing includes two plates secured therein, the gear transmission device is secured between the plates. The housing includes two elements each having a semi-circular flange engaged with each other for preventing the two elements from rotating relative to each other.

The ratchet means includes a ratchet gear provided on the second stem, a pair of pawls rotatably secured in the housing for engaging with the ratchet gear, and means for actuating the pawls to engage with the ratchet gear and disengaged from the ratchet gear and to control the driving directions between the stems. The actuating means includes a barrel rotatably received in the housing and having an actuator for engaging with the pawls, the barrel including a first end extended outward of the housing, and means for rotating the barrel to actuate the actuator of the barrel to engage with the pawls and to control the driving directions between the stems. The rotating means includes a control ferrule secured to the first end of the barrel for rotating the barrel and the actuator of the barrel.

A limiting device is further provided for limiting a relative rotational movement between the control ferrule and the housing. A device is further provided for positioning the control ferrule relative to the housing at a selected angular position.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
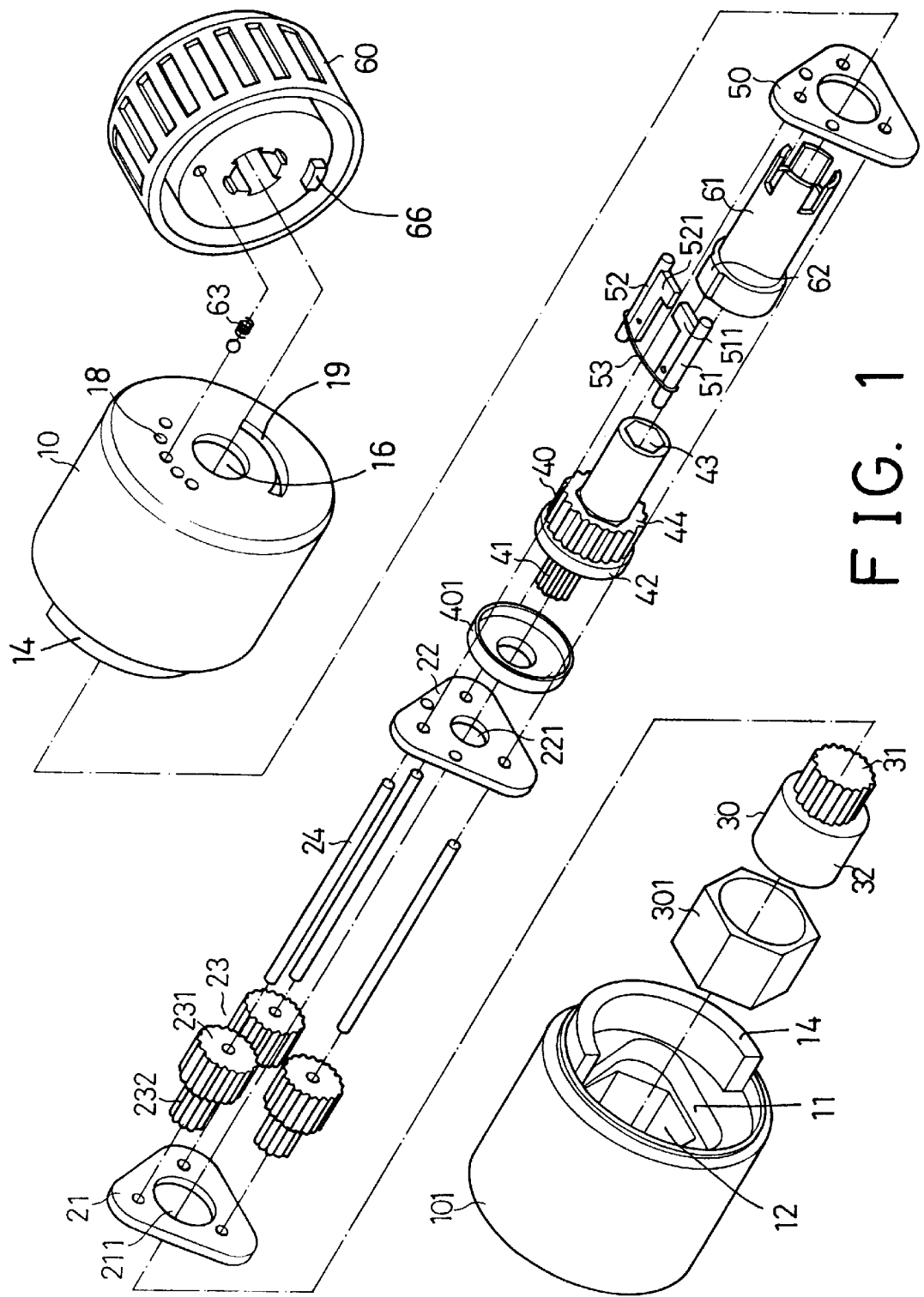
FIG. 1 is an exploded view of a cartridge in accordance with the present invention.
Figure 2:
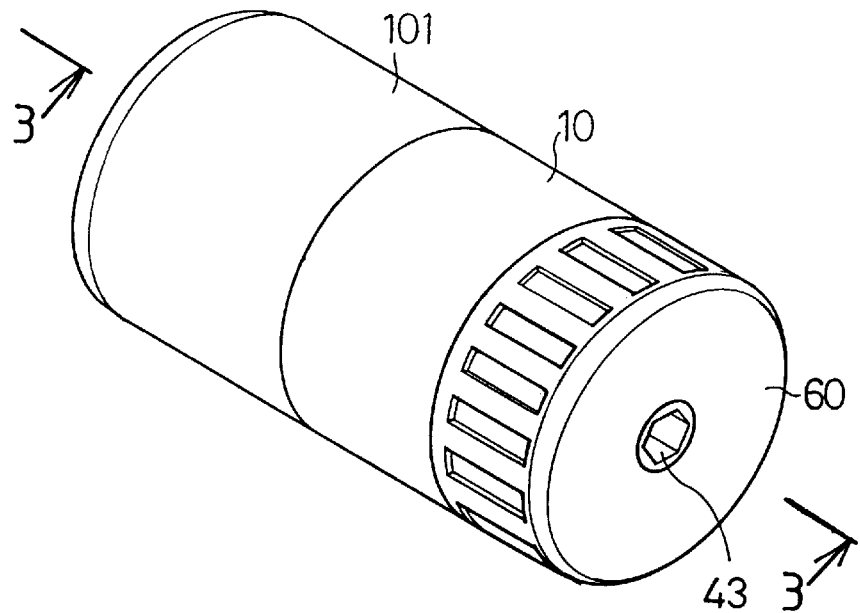
FIG. 2 is a perspective view of the cartridge.
Figure 3:
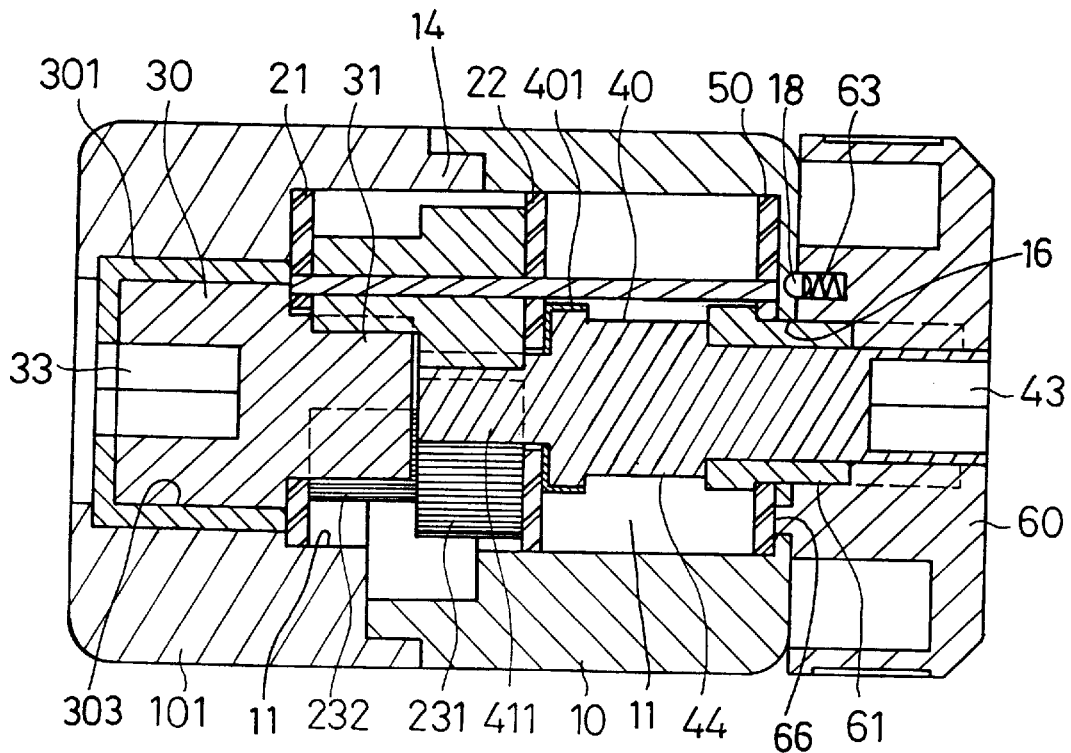
FIG. 3 is a cross sectional view taken along lines 3—3 of FIG. 2.

Referring to the drawings, and initially to FIGS. 1–3, a gear transmission cartridge in accordance with the present invention comprises a housing including two elements 10, 101 secured together by a clamping ring or other fasteners. The two elements 10, 101 of the housing each includes a triangular recess 11 and an orifice 12, 16 communicating with each other and each includes a semi-circular flange 14 engaged with each other for preventing the two elements 10, 101 from rotating relative to each other. The orifice 12 is hexagonal and the orifice 16 is circular. Two stems 30, 40 each includes a body 32, 42 and each includes an engaging hole 33, 43 formed therein (FIG. 3) for receiving tool bits. The stem 30 includes a gear 31 extended inward of the housing 10, 101 and the other stem 40 includes a gear or a pinion 41 extended inward of the housing 10, 101. The body 32 of the stem 30 is rotatably received in the orifice 12 of the element 101 by a bushing 301 which has a hexagonal outer portion for engaging with the hexagonal orifice 12 of the element 101.

Two triangular plates 21, 22 are engaged in the recesses 11 and rotated in concert with the housing 10, 101, and each includes a hole 211, 221 for rotatably receiving the gear 31, 41 of the stems 30, 40. A bushing 401 is preferably engaged between the stem 40 and the plate 22. Three or more gear members 23 are rotatably secured between the plates 21, 22 by pins 24 and each includes a gear portion 231 engaged with the gear or the pinion 41 of the stem 40 and each includes a gear portion or a pinion portion 232 engaged with the gear 31 of the stem 30 (FIG. 3). The gear 31 includes a size greater than that of the gear or the pinion 41, and the gear portions 231 include a size greater than that of the gear or the pinion portions 232 such that the stem 40 may be rotated in a greater speed by the stem 30 via the gear members 23, and such that the stem 30 may be rotated by the stem 40 with a greater torque via the gear members 23.

The triangular recess 11 of the element 10 has a greater size than that of the other element 101 such that another triangular plate 50 may be disposed in the recess 11 of the element 10 and may be secured in place by the pins 24. The stem 40 includes a ratchet gear 44 disposed between the plates 22, 50. A pair of pawls 51, 52 are rotatably secured between the plates 22, 50 and biased to engage with the ratchet gear 44 (FIGS. 4–6) by a spring 53 (FIG. 1). The pawls 51, 52 each includes an extension 511, 521 extended toward each other. A barrel 61 is rotatably received in the plate 50 and the orifice 16 of the element 10 and includes an actuator 62 for engaging with the extensions 511, 521 of the pawls 51, 52 and for disengaging the pawls 51, 52 from the ratchet gear 44. The barrel 61 has one end extended outward of the housing 10, 101 and secured to a control ferrule 60 so as to be rotated and actuated by the control ferrule 60. The element 10 has a curved slot 19 formed therein for slidably receiving a bulge 66 of the control ferrule 60 and for limiting the relative rotational movement between the control ferrule 60 and the housing 10, 101. The element 10 includes three or more cavities 18 formed therein for receiving a spring biased projection 63 of the control ferrule 60 and for positioning the control ferrule 60 relative to the housing 10, 101 at the selected angular position.

Figure 4:
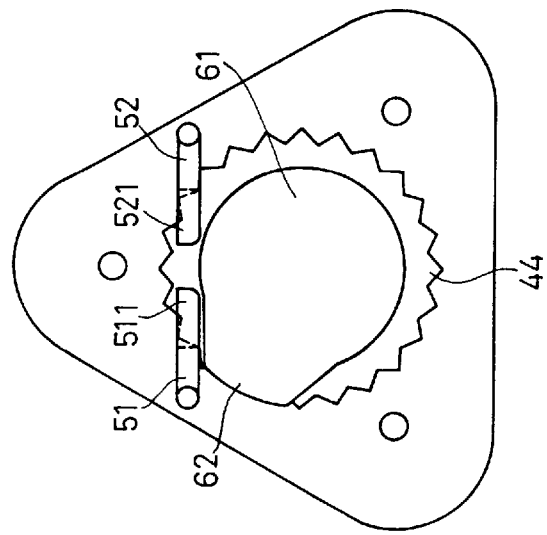

In operation, as shown in FIG. 4, when both of the pawls 51, 52 are biased to engage with the ratchet gear 44 and when the actuator 62 is disengaged from the extensions 511, 521 of the pawls 51, 52, the stem 40 is solidly secured in place by the pawls 51, 52 and may not be rotated relative to the housing 10, 101 such that the stem 30 and the tool bit or fastener engaged thereto may also be rotated by the stem 40. A tool member of such as a power tool may be engaged with the engaging hole 43 of the stem 40 for allowing the power tool to drive the fastener or the tool bit that is engaged with the engaging hole 33 of the stem 30.

Figure 6:
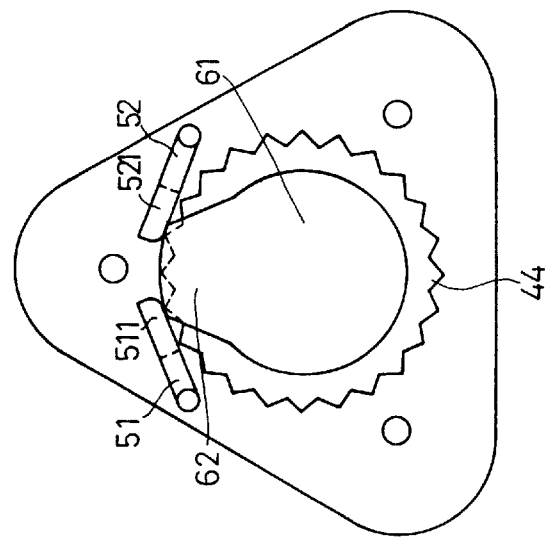
FIGS. 4, 5 and 6 are schematic views illustrating the operation of the cartridge.
Figure 5:
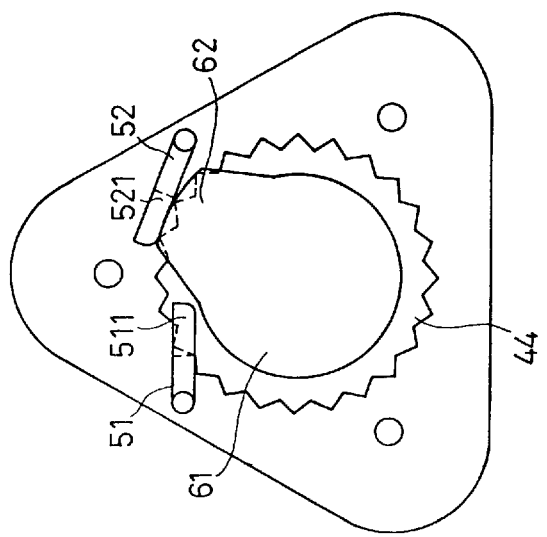

As shown in FIG. 5, when one of the pawls 51, 52 is disengaged from the ratchet gear 44, the stem 40 may be rotated in one direction in a greater speed by the stem 30, and the stem 30 may be rotated in one direction in a greater torque by the stem 40. As shown in FIG. 6, when both of the pawls 51, 52 are disengaged from the ratchet gear 44, the stem 40 may be rotated in either of the directions in a greater speed by the stem 30, and the stem 30 may be rotated in either of the directions in a greater torque by the stem 40.

It is to be noted that the gear members 23 may also be directly secured in the housing 10, 101 by the pins 24 without the plates 21, 22.

Accordingly, the cartridge in accordance with the present invention includes a gear transmission device for coupling a driving tool to a fastener and for selectively driving the fastener with a greater speed or with an increased torque.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A cartridge comprising:
    a housing including a pair of orifices formed therein, said housing including two elements each having a semi-circular flange engaged with each other for preventing said two elements from rotating relative to each other,
    a pair of stems rotatably received in said orifices respectively and each including an engaging hole formed therein for receiving fasteners, said stems each including a gear extended inward of said housing,
    a gear transmission device coupled between said gears of said stems for allowing a first of said stems to be driven by a second of said stem when said second stem is driven by a driving tool, and for allowing said second stem to be driven by said first stem when said first stem is driven by the driving tool, and
    a ratchet means for controlling driving directions between said stems.

2. The cartridge as claimed in claim 1, wherein said gear of said first stem includes a size greater than that of said second stem for allowing said second stem to be rotated in a greater speed by said first stem and for allowing said first stem to be rotated in a greater torque by said second stem.

3. The cartridge as claimed in claim 1, wherein said gear transmission device includes at least three gear members rotatably secured in said housing and each having a first gear portion engaged with said gear of said second stem and each having a second gear portion engaged with said gear of said first stem, said first gear portions of said at least three gear members include a size greater than that of said second gear portions for allowing said second stem to be rotated in a greater speed by said first stem and for allowing said first stem to be rotated in a greater torque by said second stem.

4. The cartridge as claimed in claim 1, wherein said housing includes two plates secured therein, said gear transmission device is secured between said plates.

5. A cartridge comprising:
    a housing including a pair of orifices formed therein,
    a pair of stems rotatable received in said orifices respectively and each including an engaging hole formed therein for receiving fasteners, said stems each including a gear extended inward of said housing.
    a gear transmission device coupled between said gears of said stems for allowing a first of said stems to be driven by a second of said stem when said second stem is driven by a driving tool, and for allowing said second stem to be driven by said first stem when said first stem is driven by the driving tool, and
    a ratchet means for controlling driving directions between said stems, said ratchet means including a ratchet gear provided on said second stem, a pair of pawls rotatably secured in said housing for engaging with said ratchet gear, and means for actuating said pawls to engage with said ratchet gear and disengaged from said ratchet gear and to control the driving directions between said stems.

6. The cartridge as claimed in claim 5, wherein said actuating means includes a barrel rotatably received in said housing and having an actuator for engaging with said pawls, said barrel including a first end extended outward of said housing, and means for rotating said barrel to actuate said actuator of said barrel to engage with said pawls and to control the driving directions between said stems.

7. The cartridge as claimed in claim 6, wherein said rotating means includes a control ferrule secured to said first end of said barrel for rotating said barrel and said actuator of said barrel.

8. The cartridge as claimed in claim 7 further comprising means for limiting a relative rotational movement between said control ferrule and said housing.

9. The cartridge as claimed in claim 7 further comprising means for positioning said control ferrule relative to said housing at a selected angular position.

* * * * *